(12) United States Patent
Meniere et al.

(10) Patent No.: US 7,123,746 B2
(45) Date of Patent: Oct. 17, 2006

(54) METHOD AND SYSTEM FOR DETECTING AN OBJECT IN RELATION TO A SURFACE

(75) Inventors: Jerome Meniere, Paris (FR); Christophe Migliorini, Puteaux (FR)

(73) Assignee: Poseidon, Boulogne Billancourt (FR)

( * ) Notice: Subject to any disclaimer, the term of this patent is extended or adjusted under 35 U.S.C. 154(b) by 601 days.

(21) Appl. No.: 10/149,916

(22) PCT Filed: Dec. 20, 2000

(86) PCT No.: PCT/FR00/03602

§ 371 (c)(1),
(2), (4) Date: Jun. 17, 2002

(87) PCT Pub. No.: WO01/46908

PCT Pub. Date: Jun. 28, 2001

(65) Prior Publication Data

US 2002/0191815 A1    Dec. 19, 2002

(30) Foreign Application Priority Data

Dec. 21, 1999  (FR) .................................. 99 16124

(51) Int. Cl.
  *G06K 9/00* (2006.01)
(52) U.S. Cl. ...................... 382/103; 382/106; 382/154; 382/285; 345/419; 348/169; 348/580; 356/12
(58) Field of Classification Search ................ 382/103, 382/106, 154, 285; 345/419–427; 348/169, 348/578–580; 356/3, 3.01, 12–14
See application file for complete search history.

(56) References Cited

U.S. PATENT DOCUMENTS

| 5,325,449 | A | * | 6/1994 | Burt et al. ................... 382/240 |
| 5,369,623 | A | * | 11/1994 | Zerangue ....................... 367/93 |
| 5,754,680 | A | * | 5/1998 | Sato et al. ................... 382/154 |
| 6,014,472 | A | * | 1/2000 | Minami et al. ............. 382/285 |
| 6,133,838 | A | * | 10/2000 | Meniere ................... 340/573.6 |
| 6,205,242 | B1 | * | 3/2001 | Onoguchi .................... 382/154 |
| 6,642,847 | B1 | * | 11/2003 | Sison .......................... 340/565 |
| 6,768,813 | B1 | * | 7/2004 | Nakayama .................. 382/154 |
| 6,793,350 | B1 | * | 9/2004 | Raskar et al. ............... 353/121 |
| 2004/0247174 | A1 | * | 12/2004 | Lyons et al. ................ 382/154 |

FOREIGN PATENT DOCUMENTS

| DE | 195 17 028 | 11/1996 |
| EP | 0 360 880 | 4/1990 |
| FR | 2 741 370 | 5/1997 |
| JP | 11 102440 | 4/1999 |

(Continued)

*Primary Examiner*—Bhavesh M. Mehta
*Assistant Examiner*—Manav Seth
(74) *Attorney, Agent, or Firm*—Oblon, Spivak, McClelland, Maier & Neustadt, P.C.

(57) ABSTRACT

The invention relates to a method for detecting an object (1) in relation to a surface (2). A synthetic image (3c, 4c) is produced from at least two distinct viewpoints (3, 4), for each of said viewpoints, by means of a geometrical transformation comprising at least one perspective projection (3a, 4a) of the object on the surface (2), each synthetic image being associated with the viewpoint concerned. By discriminating between the synthetic images, it is possible to detect the presence of and determine the position of the object (1) in relation to the surface (2), by searching for contrast inversions. The invention can be used for surveying a swimming pool.

24 Claims, 7 Drawing Sheets

FOREIGN PATENT DOCUMENTS

| | | | |
|---|---|---|---|
| JP | 11-102440 | * | 4/1999 |
| JP | 11-328365 | * | 11/1999 |

* cited by examiner

FIG_1

FIG_2

FIG_3a

FIG_3b

FIG_5a

FIG_5b

FIG_6

METHOD AND SYSTEM FOR DETECTING AN OBJECT IN RELATION TO A SURFACE

BACKGROUND OF THE INVENTION

1. Field of the Invention

The present invention relates to a process and a system for detecting an object in relation to a surface, said surface is not necessarily flat. In accordance with the present invention an object is defined as: a material element devoid of life and/or a person or animal. The object in accordance with the invention may be static and/or in movement. The surface in accordance with the invention may be a virtual surface or a real surface transparent or not.

2. Discussion of Background

It is necessary to detect presence and determine the position of an object in relation to a surface in a number of industrial applications, notably in order to make it possible to assess whether the object is moving in relation to this surface. The study of this relative movement gives information on the object and/or the surface.

In order to present the problem posed and resolved by the present invention in the framework of a concrete industrial application, the specific case of electronic surveillance, designed to detect an intruder moving in a defined environment, will be developed hereinafter. These electronic surveillance systems make it possible to distinguish between persons behaving abnormally in relation to those behaving normally.

More specifically, the process and the system according to the invention are applicable to the surveillance of a swimming pool in order to prevent drawings.

The patent SP2 FR 96 10442 submitted on Aug. 26, 1996 on behalf of Poséidon describes this type of surveillance system for a swimming pool while referring to the previous art. Large extracts of it will be incorporated here. Surveillance of swimming pools is either non-existent, or carried out by means of human surveillance. Such surveillance is a difficult task and requires sustained attention and causing nervous fatigue in people, notably in lifeguards, who are responsible for it. In fact, in addition to the inherent limitations of any system based on human intervention, for example a reduction of vigilance due to tiredness or momentary distraction, the surveillance of swimming pools is made extremely delicate because of the reflection of light on the surface of turbulent water, a phenomenon which makes it difficult visually to locate an immobile body or a body sinking passively, at a few metres depth. The surveillance problem in swimming pools mainly arises for swimming pools that are open to the public.

In general, a swimmer in distress sinks to the bottom but, more rarely, it occurs that he floats unconsciously in a characteristic position just below the surface of the water.

An experienced lifeguard has two to three minutes to save a drowning person from the loss of consciousness, which marks the beginning of drowning. If this period is adhered to, the person drowning will not generally experience any after-effects of the accident, after a possible stay in the hospital to clean the lungs. In general, if the help is provided in three to five minutes after the loss of consciousness, however this period varies for each individual, the drowning person may still be saved, but certainly risks irreversible injuries, notably brain damage. Over five minutes, the risk of death becomes considerable.

U.S. Pat. No. 5,043,705 already proposed the use of sonar to carry out surveillance in a swimming pool. According to this system, a sonar transceiver is at least installed in the bottom of the swimming pool and a horizontal section is watched using this machine. The implementation of such a system does present inconveniences. In effect, the signal obtained with a sonar includes the echoes from the swimming pool walls and it is extremely difficult to eliminate the noise signal received in this way in order to detect the signal corresponding to the submerged body of a person drowning. In addition, the sonar essentially makes it possible to locate the body of a drowning person through the volume of air which he holds; if a person in distress has lungs filled with water, the signal obtained will not conform in any way with that which may be expected and might not even be located by processing the signal. Consequently it may be established that such a system is not likely to be satisfactory.

The patent application WO 95/34056 also proposed the implementation of cameras applicable in the field of visible waves for the surveillance of a swimming pool. These cameras are installed so that the zone observed is situated in a volume near and parallel to the bottom of the swimming pool.

In this system the cameras only observe a section of water parallel to the bottom, which implies multiplication of the cameras if the bottom is not flat and leaves the majority of the volume of the swimming pool unwatched. In addition, this system does not make it possible to detect an immobile body floating just below the surface of the water. This system consequently cannot be satisfactory.

A surveillance system for a swimming pool is described in patent application SP2 (FR 96 10442 Poséidon) which consists of:

means of detection (notably video cameras positioned in waterproof compartments) appropriate for giving images of bodies submerged in the water of the swimming pool in the form of electrical signals, these means of detection are planned in the sides of the swimming pool and places judiciously chosen to sweep at least a fraction of the water volume in the swimming pool;

means of digitisation of the electrical signals obtained;

means of temporarily and permanently storing the digital image data at successive moments;

means of comparison between digitised images of the same body at successive moments;

means of estimating the nature of a body (human body or not), of the trajectory and changes in attitude of the body according to these successive images;

and means for making decisions appropriate for setting off an alarm in the event of a suspicious trajectory or movement of the body being observed.

The means of comparison of the digitised images between successive moments are appropriate only to take forms into consideration, of which the dimensions at least correspond to those of a child, in order to eliminate false alarms being caused by foreign bodies. In addition, these means of comparison are implemented in order to isolate a form and follow its trajectory at successive moments.

The means of estimating are appropriate to determine the slow nature of a movement and/or the immobility of a human body in the swimming pool by means of the results of the means of comparison.

The means for making decisions are appropriate for setting off an alarm if the slow nature of a movement or the almost-immobility of a body in the swimming pool continues over a defined period, in particular over 15 seconds.

One or numerous control screens are positioned by the lifeguards' chairs or in the offices of the persons responsible for surveillance of the swimming pool, screens on which the images are shown of a zone considered suspect. The alarm may be given through a sound and/or visual warning, in particular with an indication of the zone of the swimming pool in which a suspicious event is taking place.

No matter how perfected they are, such systems cannot always make it possible to distinguish an object in front of the bottom. In fact, in the event that a single camera is used, it is not always possible to distinguish a shadow of a body of a swimmer passively floating, moving along the bottom. Admittedly, in the event that numerous cameras are used to observe the same object from numerous points of view, the parallax effect should, in principle, make it possible to distinguish a dense object situated in front of the bottom of a bi-dimensional mark situated on the bottom. In any event numerous conditions must be met in order for the parallax effect to adequately sensitive. On the one hand, it is desirable for the viewpoints to be close to the object being observed. This first condition implies that numerous cameras will be used for surveillance over a large zone in relation to the dimensions of the objects that one hopes to detect. In correlation, this type of system is consequently particularly costly. On the other hand, it is desirable that the depiction of colours perceived by each camera is identical. Now, in order for this to be the case it is essential for the opto-electronic characteristics of the video cameras to be the same, which is not always the case. In addition the optical route between the object and each camera may cross environments with different refraction or transparency indexes. This is notably the case when the body being observed is submerged in a swimming pool with a turbulent surface. The depiction of the colours of the object being observed by each camera is not the same. Consequently the geometric correlations that make it possible to establish that the images (their outlines and grey scale nuances) produced by each camera come from the same dense object situated in front of a coloured bottom, can not longer be verified with certainty. Consequently confusion is possible between a shade of colour (for example a shadow being carried) on the bottom of the swimming pool and a dense object close to the bottom. Consequently, the result is that errors in detection and false initiation of the alarm systems.

The present invention is intended to avoid the inconveniences of the processes and systems known as yet, no matter how efficient they are.

SUMMARY OF THE INVENTION

The process and the system according to the invention were originally conceived for surveillance in swimming pools and the prevention of incidents of drowning. In any event, it quickly became apparent that the image processing techniques consisting of analysing the image of a dense object in a general way in relation to a surface, could be applied to surfaces including virtual surfaces and objects located before or behind such surfaces. Due to this fact they are appropriate for application in fields other than the surveillance of swimming pools.

Process

The present invention relates to a process for detecting an object in relation to a surface, notably a virtual surface, said surface is not necessarily flat.

The process according to the invention includes a step for realising a computer-generated image associated to the viewpoint being considered for each viewpoint by means of a geometric conversion at least including a projection in perspective of said object on said surface from at least two distinct viewpoints.

Further in the description the computer-generated image associated to the viewpoint considered is defined as the image obtained by the application of the geometric conversion at the scene being observed from said viewpoint whether or not there is an object.

In addition said process includes a stage for distinguishing between the computer-generated images for detecting a presence and determining the position of said object in relation to said surface.

In order to distinguish between the different computer-generated images said process additionally includes the following stages:

the stage for breaking said surface down into a mosaic of fields ($Z_i$) each including a centre ($C_i$).

the stage for associating a specific direction ($D_i$) to each centre ($C_i$) and each viewpoint.

In this way each computer-generated image is broken down in virtual fields ($z_i$) each consisting of as many specific virtual directions ($d_i$) as there are viewpoints.

The process according to the invention also includes the following stages in order to distinguish between the computer-generated images:

the stage of selecting at least a couple of computer-generated images associated to at least a couple of viewpoints, the stage of choosing zones situated according to each of the specific virtual directions ($d_i$) of each virtual field ($z_i$) on each computer-generated image of the couple selected, the stage of comparing said zones in searching for opposing differences from one computer-generated image to another.

If opposing differences appear as a result of the search it is possible to conclude that there is an object.

Preferably, in order to determine whether an object is before and/or behind said surface, zones of comparison are selected for each of the specific virtual directions ($d_i$) on one side and/or the other side of said centres ($c_i$) of said virtual fields ($z_i$) in relation to each of the viewpoints.

Preferably, in order to determine whether said object extends to further or less far in relation to said surface, zones of comparison more or less distant from said centres ($c_i$) of the virtual fields ($z_i$) are chosen for each of the specific virtual directions ($d_i$).

Preferably, the process according to the invention also includes the stage of deducing the position of said object along the surface in relation to the position of the fields on the surface ($z_i$) for which opposing differences have been found.

Preferably, in order to realise each of said computer-generated images associated to a viewpoint being considered, radioactive emissions and/or electromagnetic rays (notably lights) and/or mechanical vibrations emitted from said object are captured in each viewpoint in such a way as to produce a signal, said signal is digitised in order to obtain digital data, said computer-generated images are calculated on the basis of the data obtained in this way.

Preferably an optical camera and/or a sonar is/are implemented at each viewpoint in order to capture the electromagnetic rays, notably lights, and/or mechanical vibrations, notably ultrasounds.

Preferably, when said computer-generated images show different coloured zones, in order to search for the opposing differences in each computer-generated image of the selected couple, inversions of colour contrasts between the zones situated along each of the specific virtual directions (di) of each field (zi) are searched for.

According to a realisation variant, the invention also relates to a process more specifically intended to detect an object in front of a bottom, in this case said bottom constitutes said surface.

In the event of this realisation variant, said geometric conversion also includes a projection, on a surface of reference (notably a flat surface) associated in the viewpoint being considered, with the virtual image resulting from the projection in perspective of said object on said bottom from said viewpoint being considered. Favourably, the projection on the surface of reference is an orthogonal projection. Equally in the event of this realisation variant, said computer-generated image associated to the viewpoint being considered consists of:

the image realised by means of the application of said geometric conversion on said object, and in addition to the superposition, on said surface of reference, the image realised through the application of said geometric conversion on a virtual representation consisting of sections of the bottom not masked by said projection of the object in perspective.

Preferably, data relating to the computer-generated image on said surface of reference is calculated on the basis of said digitised data in order to realise said computer-generated image on a surface of reference, in the event of this realisation variant.

The invention is also intended for an application implementing the aforementioned technical features and intended for the surveillance of bodies in a swimming pool. In the event of this application, said bottom consists of the bottom and/or sides of the swimming pool. In the event that, after discrimination of the computer-generated images, it is concluded that there is a body in the swimming pool:

the procedure for discrimination in order to distinguish a body with a suspicious trajectory, notably an immobile body sinking passively from a body with a normal trajectory is reiterated, an alarm signal is emitted if the body has a suspicious trajectory for an abnormally long period of time.

Preferably this application relates to the event in which the body is situated close to the bottom.

Preferably in the event of this application:

at least two viewpoints are located in the sides of the swimming pool in positions appropriate for sweeping at least a fraction of the volume of water in the swimming pool, said surface of reference is roughly parallel to the surface of the water in the swimming pool.

System

The invention also relates to a system for detecting an object in relation to a surface, notably a virtual surface, said surface not necessarily being flat.

The system according to the invention consists of means of detection and the first means of calculation of a central processing unit in order to realise a computer-associated image associated to the viewpoint being considered by means of a geometric conversion consisting of at least a projection in perspective of said object on said surface from at least two distinct viewpoints.

In addition said system includes means for discriminating between the computer-generated images. The said means for discriminating make it possible to detect the presence and determine the position of said object in relation to said surface. Preferably, said means of discrimination include means of division in order to break down said surface into a mosaic of fields (Zi) each including a centre (Ci) and as many specific directions (Di) as there are viewpoints. Each computer-generated image is also broken down into virtual fields (zi) each including as many specific virtual directions (di) as there are viewpoints.

In addition said means of discrimination include discrimination between computer-generated images:

means of selection in order to select at least a couple of computer-generated images associated with at least a couple of viewpoints, means for choosing zones situated according to each of the specific virtual directions (di) of each virtual field (zi) on each computer-generated image of the couple selected, means of comparison for comparing said zones by searching for opposing differences of one computer-generated image to the other.

The presence of an object is the conclusion if opposing differences appear during the search.

Preferably, in order to determine whether an object is before and/or behind said surface, said means for choosing the zones on each of the specific virtual directions (di) choose the zones of comparison on one side and/or the other of said centres (ci) of said virtual fields (zi) in relation to each of the viewpoints.

Preferably, in order to determine whether said object extends further or less far in relation to said surface, said means for choosing the zones on each of the specific virtual directions (di) choose zones of comparison that are more or less distant from said centres (ci) of the virtual fields (zi).

Preferably, the means of discrimination to discriminate between the computer-generated images defining the position of said object along the surface in relation to the position on the surface of the fields (zi) for which opposing differences have been found.

Preferably, in order to realise each of said computer-generated images associated to a viewpoint being considered, said system includes sensors, at each viewpoint. The said sensors include means for capturing radioactive emissions and/or electromagnetic rays (notably lights) and/or mechanical vibrations emitted from said object, so as to produce a signal. The said system also includes:

means for digitisation in order to digitise said signal and in order to obtain digitised data, means for calculation in order to calculate said computer-generated images on the basis of data obtained in this way.

Preferably, said sensors for capturing electromagnetic rays, notably lights, and/or mechanical vibrations, notably ultrasounds, are optical cameras and/or sonars situated at each viewpoint.

Preferably, said means of discrimination including the means for studying the inversions of the colour contrasts between the zones situated according to each of the specific virtual directions (di) of each field (zi) in order to study the opposing differences on each computer-generated image of the couple selected if said computer-generated images show different coloured zones.

According to a realisation variant the invention also relates to a system more particularly intended to detect an object in front of a bottom, in this case said bottom consists of said surface.

In the event of this realisation variant, said geometric conversion also includes a projection, on a surface of reference (notably a flat surface) associated in the viewpoint being considered, with the virtual image resulting from the projection in perspective of said object on said bottom from said viewpoint being considered. Favourably, the projection on the surface of reference is an orthogonal projection. Equally in the event of this realisation variant, said computer-generated image associated to the viewpoint being considered consists of:

the image realised by means of the application of said geometric conversion on said object, and in addition to the superposition, on said surface of reference, the image realised through the application of said geometric conversion on a virtual representation consisting of sections of the bottom not masked by said projection of the object in perspective.

Preferably, data relating to the computer-generated image on said surface of reference is calculated on the basis of said digitised data in order to realise said computer-generated image on a surface of reference, in the event of this realisation variant.

The invention is also intended for an application implementing the aforementioned technical features and intended for the surveillance of bodies in a swimming pool. In the event of this application, said bottom consists of the bottom and/or sides of the swimming pool. In the event that, after discrimination of the computer-generated images, it is concluded that there is a body in the swimming pool, said system also includes:

means for reiteration in order to reiterate the procedure for discrimination and in order to distinguish a body with a suspicious trajectory, notably an immobile body or a body sinking passively from a body with a normal trajectory, means of emission in order to emit an alarm signal if the body has a suspicious trajectory for an abnormally long period of time.

Preferably this application relates to the event in which the body is situated close to the bottom.

Preferably in the event of this application:

at least two viewpoints are located in the sides of the swimming pool in positions appropriate for sweeping at least a fraction of the volume of water in the swimming pool, said surface of reference is roughly parallel to the surface of the water in the swimming pool.

BRIEF DESCRIPTION OF THE DRAWINGS

Other characteristics and advantages of the invention become apparent on reading the description of the realisation variants of the invention, given as an indicative and unrestrictive example, and from:

FIG. 3$b$ which represents a perspective view of an object situated in front of a bottom after orthogonal projection on a first level of reference associated to a first viewpoint and on a second level of reference associated to a second viewpoint, FIG. 4 which represents a perspective view of computer-generated images in the event that there is no object in front of the bottom.

FIGS. 5$a$ and 5$b$ which represent the views below the two levels of reference represented in FIG. 3$b$, FIG. 6 which represents a perspective view of a swimming pool in which a body is submerged close to the bottom, FIG. 7 which represents a schematic view of opto-electronic systems according to a realisation variation of the invention.

DESCRIPTION OF THE PREFERRED EMBODIMENTS

In the event of the realisation variation represented in referring to FIGS. 1 to 7, the surface in relation to which the position of an object is detected and determined, is an opaque bottom. The detailed description which follows may be applied by a tradesman in the event of an object situated in front of or behind a transparent surface or a virtual surface.

Figure 1:
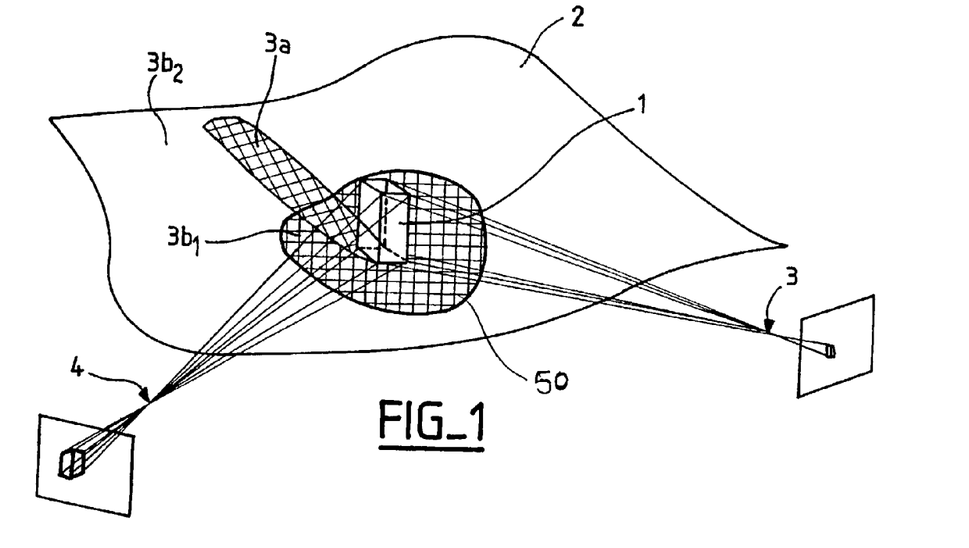
FIG. 1 which represents a perspective view of an object situated in front of a bottom and of the projection in perspective of the object and the virtual representation of the bottom from a first viewpoint, FIG. 2 which represents a perspective view of the same object situated in front of the same bottom and of the projection in perspective of the object and the virtual representation of the bottom from a second viewpoint, FIG. 3 which represents a perspective view of an object situated in front of a bottom and on which the virtual fields Zi are shown, their centre Ci and the specific directions 3D$i$ and 4D$i$ associated with viewpoints 3 and 4.
Figure 2:
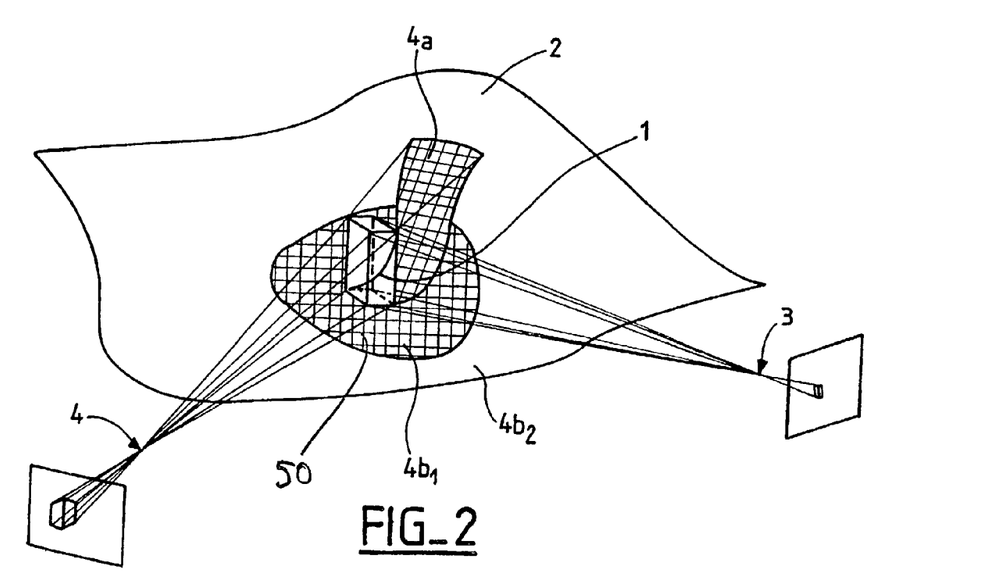
Figure 3A:
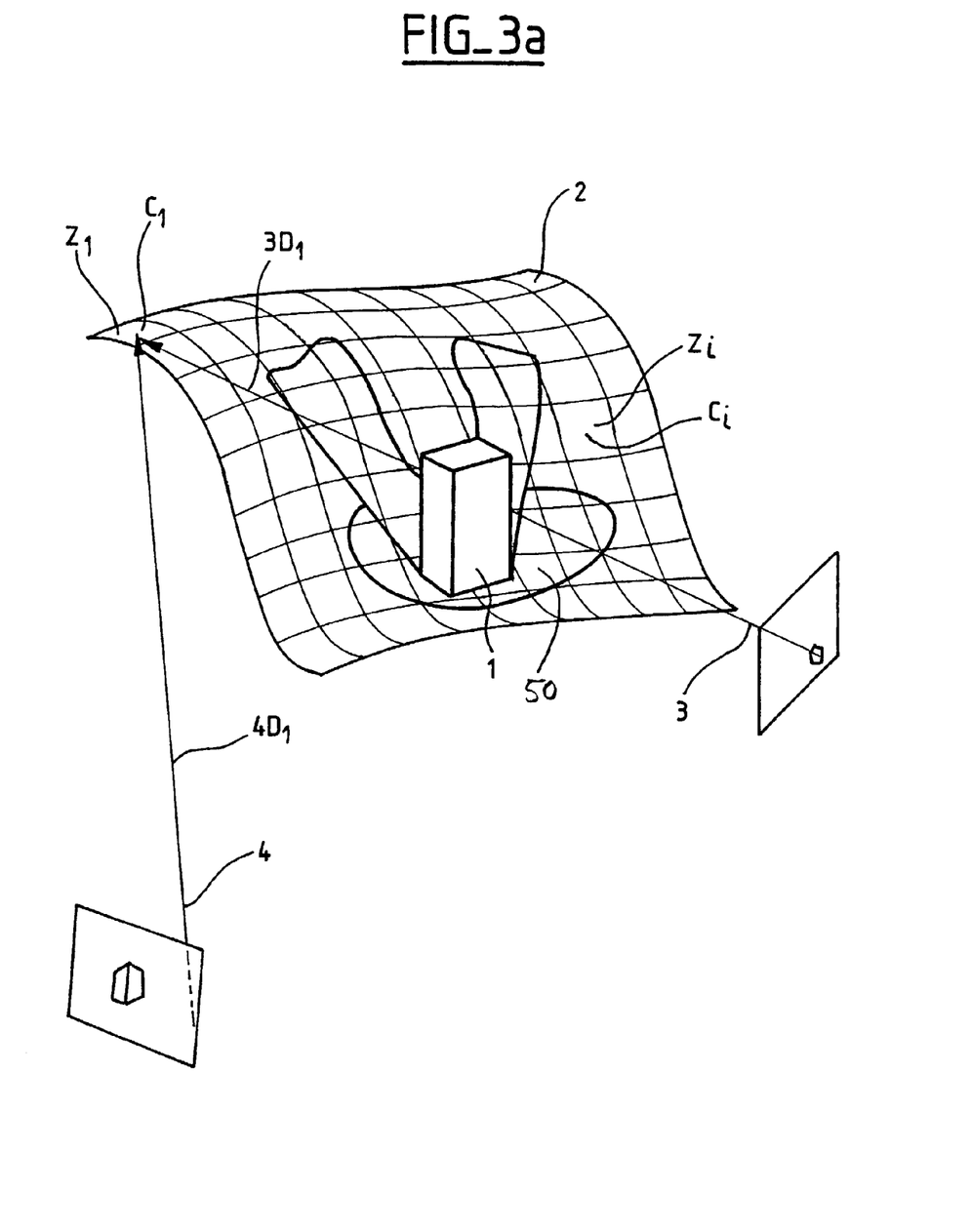
Figure 3B:
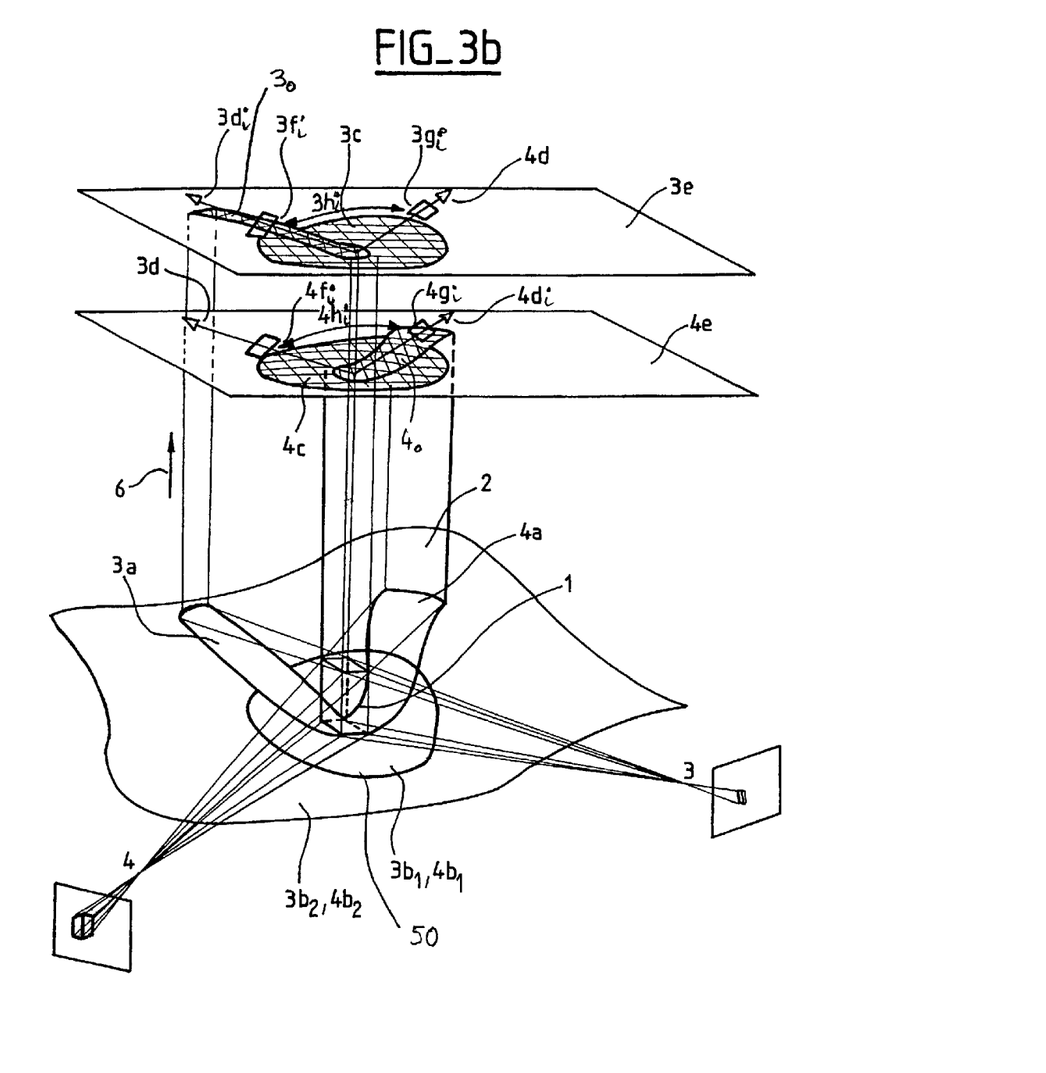

An object 1 is represented in front of a bottom 2 in FIGS. 1, 2, 3$a$ and 3$b$. Bottom 2, is bumpy, and defined by a "square" outline in the form of a "lip", it shows a "coloured mark" 50 contrasted in relation to the bottom. The following is realised by means of a geometric conversion including a projection in perspective on said bottom 2 from at least two distinct viewpoints 3, 4 and for each of these:

a projection in perspective 3$a$, 4$a$ of the object on said bottom and a virtual representation 3$b$1, 3$b$2; 4$b$1, 4$b$2 of the sections of the bottom not masked by said projection of the object in perspective.

The reference 3$b$1 (respectively 4$b$2) shows the section of the bottom (not masked), seen from viewpoint 3 (respect. 4), which includes a "colour mark".

The reference 3$b$2 (respectively 4$b$2) shows the section of the bottom (not masked), seen from viewpoint 3 (respect. 4), which does not include a "colour mark".

The virtual representation 3$b$, 4$b$ of sections of the bottom not masked by said projection in perspective of object 1 is the union of zones 3$b$1 and 3$b$2 (viewpoint 3) and zones 4$b$1 and 4$b$2 (viewpoint 4).

The FIG. 3$a$ shows the paving of the bottom consisting of virtual fields Zi each including a centre Ci and two specific directions 3D$i$ (resp. 3D1) and 4D$i$ (resp. 4D1) obtained by joining viewpoints 3 and 4 to centre Ci (resp. C1) of field Zi (resp. Z1) being considered. The centre C1 has been shown on field Z1 situated at the top left as well as the specific associated directions 3D1 and 4D1.

In the event that the geometric conversion only consists of the projection in perspective described above, the computer-generated image, according to the present invention (classified as 3$c$, 4$c$ hereinafter) consists of projections in perspective 3$a$ and 4$a$ of the object on said bottom.

FIG. 3$b$ shows how the computer-generated image 3$c$, 4$c$ is realised in the event that the geometric conversion includes an orthogonal projection 6 on the surfaces of reference 3$e$, 4$e$ associated with viewpoints 3 and 4 after an operation of projection in perspective.

In the example of realisation represented in FIG. 3, each computer-generated image (respectively 3$c$ and 4$c$) is obtained by means of an orthogonal projection 6 and superposition of each projection in perspective (respectively 3$a$ and 4a) and each virtual representation of the bottom (respectively 3b and 4b) on flat surfaces or reference (respectively 3e and 4e). The orthogonal projections, according to direction 6, the virtual projections 3a and 4a are respectively classified 3o, 4o, on FIG. 3b. It should be stated that each virtual representation 3b, 4b of the sections of the bottom not masked by said projection in perspective 3a, 4a of the object on the bottom, consists of sections 3b1, 3b2, 4b1, 4b2 defined above.

FIGS. 1 to 3 are geometric constructions for convenience of the description. In fact, as it will now be described, physical means and means of calculation are implemented in order to realise each of said computer-generated images 3c, 4c of the object and the bottom associated to a viewpoint being considered 3, 4. In the first place, radioactive emissions and/or electromagnetic rays (notably light) and/or mechanical vibrations, notably ultrasounds, emitted from the object and the bottom, so as to produce a signal are captured in each viewpoint 3, 4. In the event of the realisation variation relating to the surveillance of swimming pools represented in FIG. 6, an opto-electronic camera 31, 41 is implemented at each viewpoint 3, 4 in order to capture the rays of light emitted by the object and the bottom, which is situated in a box 32, 42 as described in the patent application SP2 (FR 96 10442 Poséidon) and for which the description is incorporated here as a reference. The output signal of the camera is representative of the image of object 1 and of the bottom 2 produced by the opto-electronic camera.

It is also possible to use a sonar in each viewpoint 3, 4 and to capture the echo emitted by the different sections of body 1 and bottom 2 and to produce a representative signal of their form and content.

In the known way, the signal produced by the camera and/or the sonar is digitised then the digitised data obtained in this way is used to calculate said computer-generated images. If bottom 2 is flat and/or if an analytical representation of the bottom is known, it is possible directly to calculate the virtual projections 3a, 4a of the object on the bottom 2 and/or the virtual representations 3b, 4b of the sections of the bottom not masked by said virtual projections. Then, it is possible subsequently to calculate the computer-generated images 3c and 4c by means of orthogonal projection 6 of the virtual projections 3a, 4a and the virtual representations 3b, 4b on the levels of reference 3e and 4e, for which an analytical representation is also known. If the bottom is not flat as that shown in FIGS. 1 to 4, said bottom is sampled beforehand, notably by drawing up a topographical plan of it, in order to obtain a digital model.

The specific virtual directions 3di and 4di of each of the virtual fields zi of the computer-generated images associated to the virtual fields Zi of the mosaic forming the bottom are obtained by means of orthogonal projection on the levels of reference 3e and 4e of specific directions 3Di and 4Di defined above.

Figure 4:
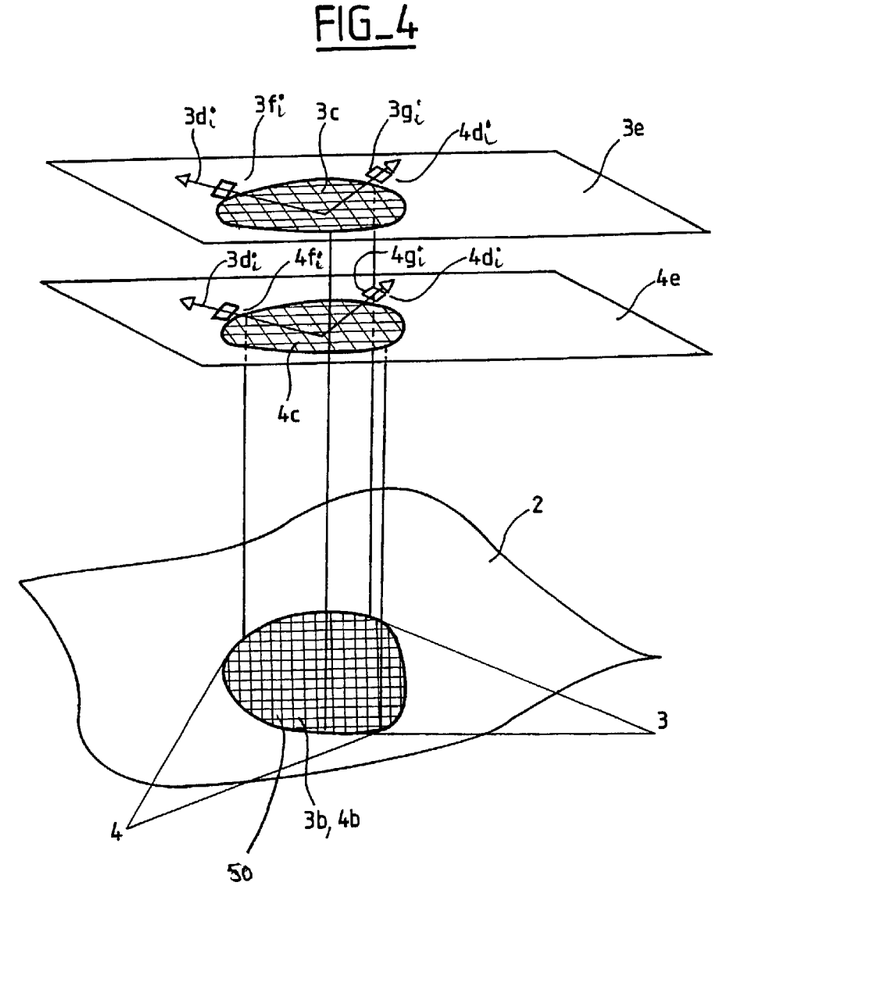
Figure 5A:
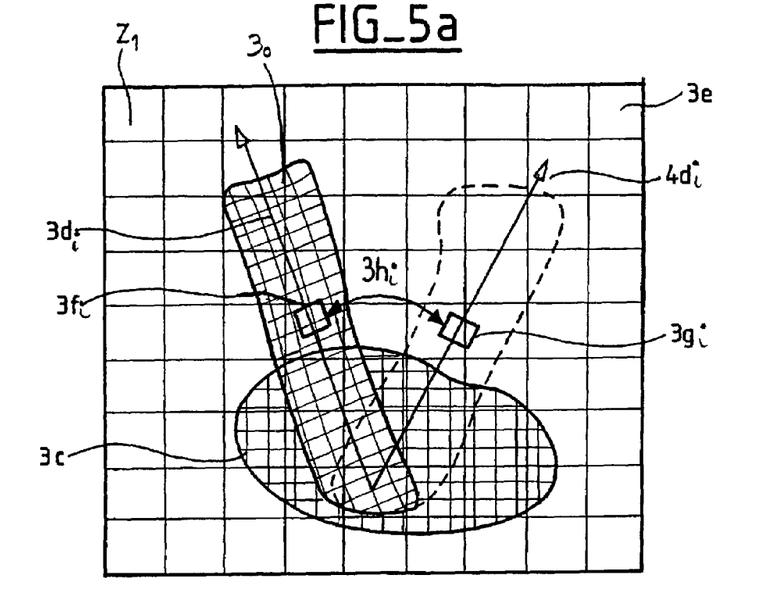
Figure 5B:
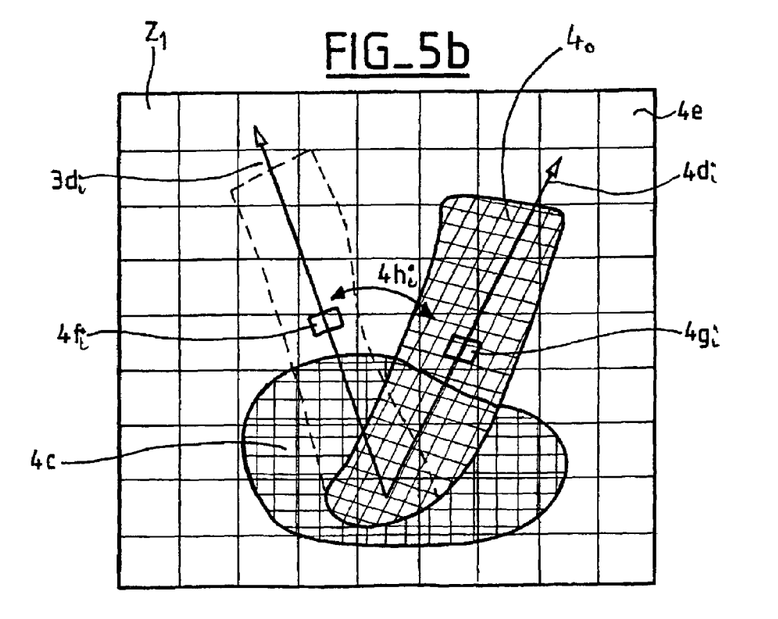

If there is no object 1 in front of the bottom (case as shown in FIG. 4), the computer-generated images 3c and 4c are reduced to virtual projections of the bottom 2 on the levels of reference 3e and 4e. The two virtual projections 3c and 4c are similar.

If there is an object 1 in front of the bottom (case shown in FIGS. 5a and 5b), the computer-generated images 3c and 4c are not similar. They comprise of distinct zones 3o, 4o which extend along the specific virtual directions (3di, FIG. 5a) and (4di, FIG. 5b) associated to the field(s) Zi situated directly below the object (in orthogonal projection on the levels of reference 3e and 4e). These zones correspond to the virtual projections 3a and 4a of the object on the bottom 2.

Proceed as follows in order to distinguish between the computer-generated images 3c, 4c and in order to determine the presence of an object 1 in relation to surface 2: Select a couple of computer-generated images 3c, 4c associated to at least a couple of viewpoints 3, 4. Study (see FIG. 5a and 5b) each computer-generated image 3c, 4c of the couple selected choosing zones 3fi, 3gi (level of reference 3e), 4fi, 4gi (level of reference 4e) situated along each of the specific virtual directions 3di, 4di of each virtual field zi. Then compare 3hi, 4hi of said zones 3fi, 3gi, 4fi, 4gi by searching out opposing differences of a computer-generated image 3c with the other 4c.

More particularly in the event that the computer-generated imaged 3c, 4c present zones 3fi, 3gi, 4fi,4gi of different colours, proceed as following in order to search out opposing differences in each computer-generated image 3c, 4c of the couple selected. Inversions of colour contrasts between zones 3fi, 3gi,4fi, 4gi situated along each of the specific virtual directions 3di, 4di of each field zi are sought. Computer-generated images presenting zones of different colours are notably obtained when video cameras are used.

If opposing differences between one computer-generated image and another appear for a certain number n of fields zi (n may be equal to 1), for example if 3fi is grey while 3gi is not and if 4fi is not grey while 4gi is, it must a fortiori be concluded that there is an object in front of the bottom. In analysing the colour contrasts along the specific virtual directions 3di and 4di, in seeking the inversion of contrasts it is possible to deduce whether or not there is an object 1 in front of the bottom. In any event, searching out the opposing differences may relate to other elements that the colours and shades of grey. It may also be possible to find opposing differences in the forms, in the surroundings of the outlines.

Figure 6:
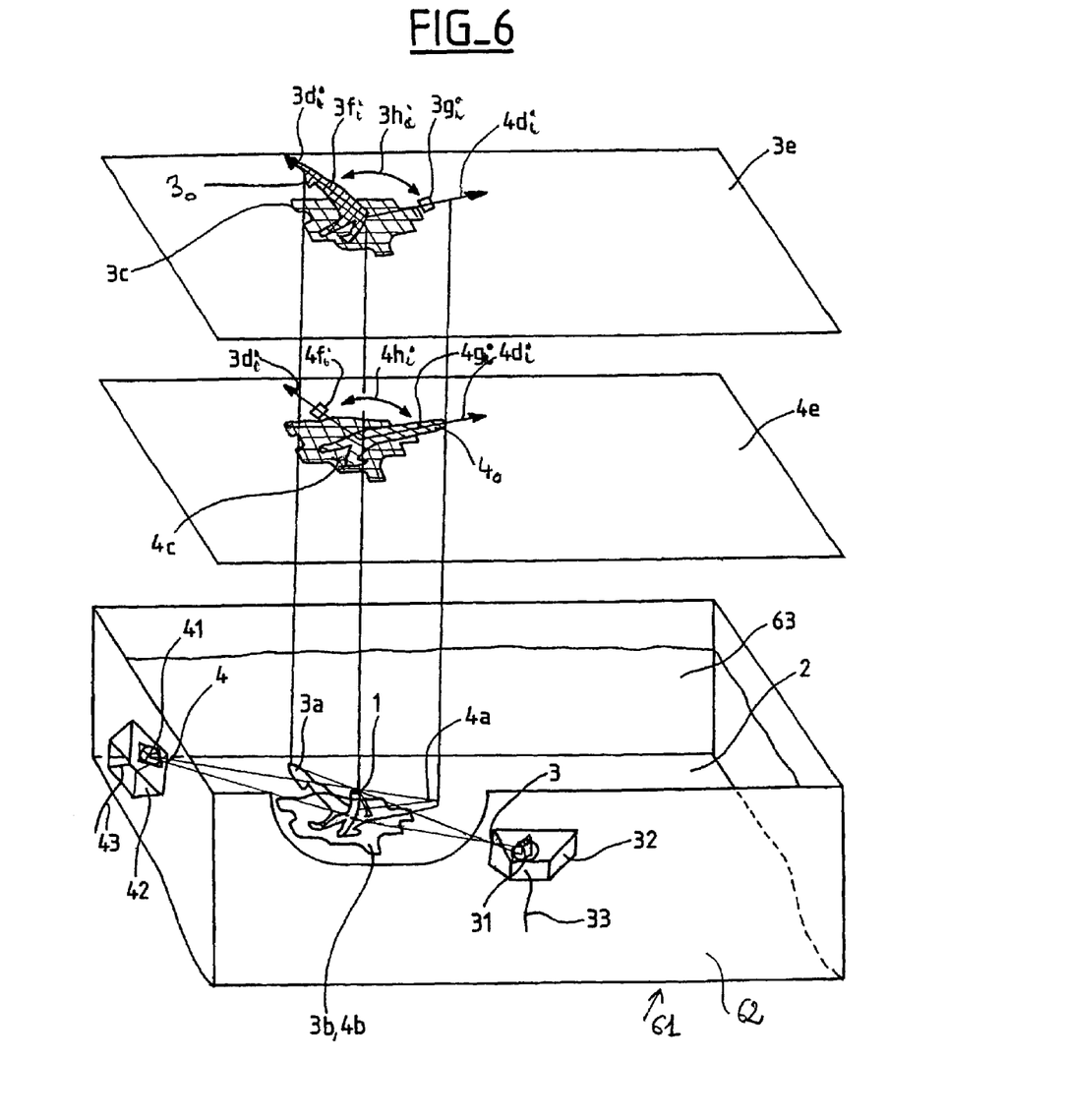

An application of the process and system according to the invention to the surveillance of bodies 1 in a swimming pool 61 was represented in referring to FIG. 6. Elements may be recognised in FIG. 6 which have already been described in reference to FIGS. 1 to 5; it bears the same references. For example, the bottom 3 is the bottom of swimming pool 61 and/or its sides 62. Object 1 is the body of a swimmer in distress. In the event of this application, proceed as described above in order to distinguish the computer-generated images and to determine whether there is a body in front of the bottom, more particularly close to it. Then, reiterate the procedure of discrimination in order to distinguish a body with a suspicious trajectory from a body with a normal trajectory, by carrying out an analysis of movements, notably an immobile body or a body sinking impassively. An alarm signal is emitted if the body has a suspicious trajectory for an abnormally long period of time.

In the event of the application of the process and the system according to the invention for the surveillance of a swimming pool, the two optical cameras 31 and 41 located in boxes 32 and 42 associated to viewpoints 3 and 4, are situated in the sides 62 forming a 90° angle between them. Such a situation is appropriate to sweep at least a fraction of the volume of water in the swimming pool. In this regard we refer to the patent application SP2 (FR 96 10442 Poséidon) incorporated here by reference. The levels of reference 3e and 4e are roughly parallel to the surface 63 of the water in the swimming pool.

Figure 7:
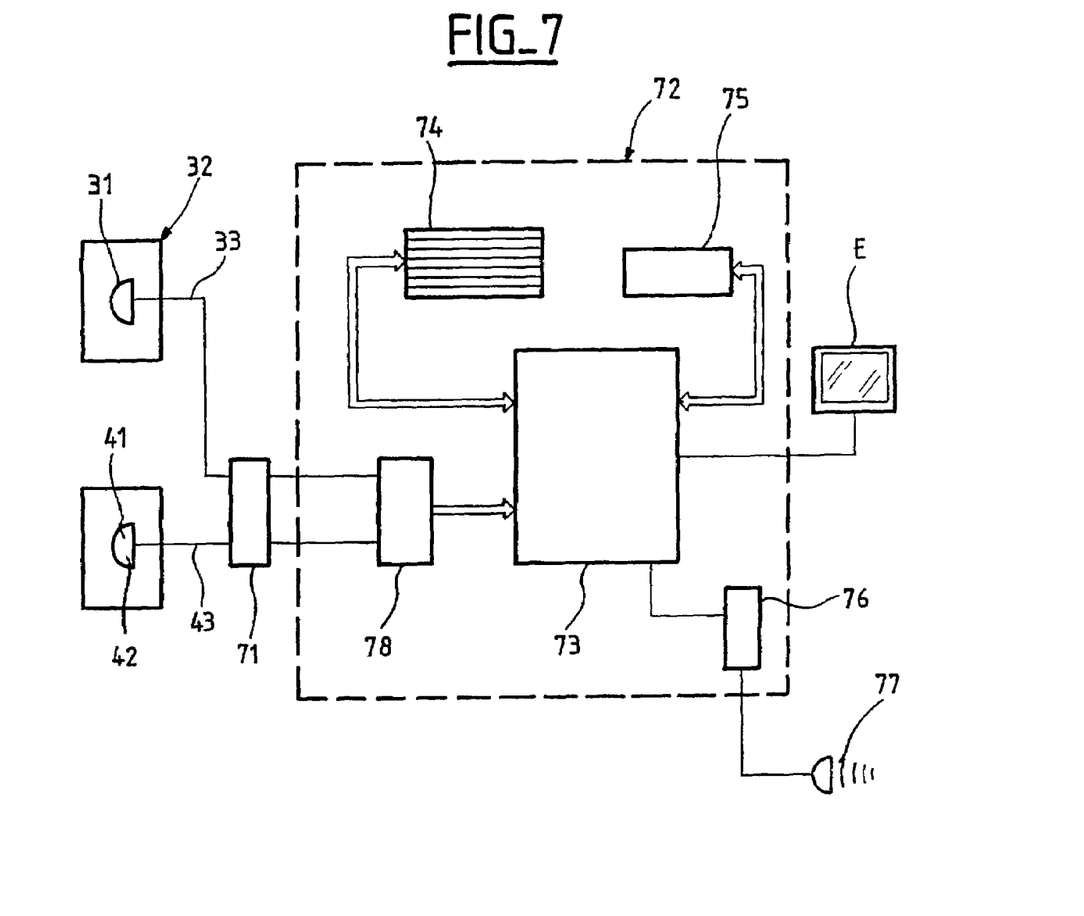

Now a schematic view of the opto-electronic systems and the means of calculation according to a realisation variant of the invention will be described here while referring to FIG. 7.

Cables 33, 43 which cross boxes 32, 42 containing cameras 31, 41, are coax cables, connected to a microcomputer 72, for example of the "IBM compatible" type constructed around a PENTIUM microprocessor, by means of a multiplex system 71. A continuous power supply is established on each cable 33, 43 intended to supply the corresponding camera 31, 41. The said camera 31, 41 sends a modulation, which constitutes the signal to be processed through the cable 33, 43. Before input into the multiplex system 71, the separation of the continuous component must be assured thanks to the demodulation means which supply the signal emitted by the camera of the "CCD" type, solely by means of a multiplex system. The microcomputer 72 includes a central processing unit 73, means for temporary storage, or RAM (Random Access Memory), means for permanent storage, or hard disk 75, and a remote control card 76 which is able to control the alarm systems 77. In addition, the microcomputer 72 is connected to a control screen E, said screen is a touch screen which allows control of operation. The microcomputer 72 is configured as "multimedia" and is equipped with a video capture card 78, which converts these into digital images.

Thanks to the multiplex system it is possible to process cameras 31 and 41 with the same video capture card 78. It should be noted that the number of cameras processed by the same card may be greater than two.

The central processing unit 73 makes it possible to carry out various calculations making it possible to produce computer-generates images 3c, 4c. The central processing unit 73 also carries out the calculations which make it possible to distinguish between the computer-generated images 3c, 4c, according to whether or not there is an object in front of the bottom, by applying the procedures described above.

The storage means 74, 75 of the digital data of computer-generated images at successive moments t, (t+Dt) have been provided. These storage means 74, 75 consist of the microcomputer 72's memory systems, notably the internal RAM memory 74 and the hard disk 75 of the computer. The means of comparison between the computer-generated images at successive moments t and (t+Dt) have been provided. The means of comparison are formed by the central processing unit 73 of the computer and appropriate software stored in an areas of the internal RAM 74. The time interval Dt between two moments t and (t+Dt) taking into consideration is adequate in order, in the event of a normal movement of a swimmer, the differences between the two successive images translate such a movement. However, the interval of time Dt is also as small as possible in order to make it possible to set off the alarm without any delay in the event of a suspicious situation. This interval Dt may be a few tenths of a second. The means of comparison, between two moments t and (t+Dt), calculate the difference between the matrices of the two computer-generated images. The means of comparison make it possible to obtain the zones of change between two images at successive moments in this way, in other words the zones of movements between two moments being considered. The central processing unit 73 combined with appropriate software, also constitutes means of estimating the nature of a body 1, for which the computer-generated image is obtained (human body or not), of the trajectory and of the changes of attitude of this body. In addition the central unit 73 and the software are provided to constitute the means for making decisions appropriate for setting off an alarm in the event of a suspicious trajectory or movements of the body being observed. The fact that the matrix of the initial image is known (empty swimming pool), makes it possible to count and follow the different forms moving in the swimming pool captured by the cameras individually.

The invention claimed is:

1. A process for detecting an object in relation to a surface, said surface not necessarily being flat, said process comprising:
realizing a computer-generated image associated to a viewpoint being considered for each viewpoint by a geometric conversion at least including a projection in perspective of said object on said surface from at least two distinct viewpoints;
distinguishing between the computer-generated images for detecting a presence and determining a position of said object in relation to said surface, said distinguishing between the different computer-generated images including:
breaking said surface down into a mosaic of fields each including a center; and
associating a specific direction to each center and each viewpoint,
wherein each computer-generated image is broken down in virtual fields each including as many specific virtual directions as there are viewpoints, said process further including, to distinguish between the computer-generated images:
selecting at least two computer-generated images associated to at least two viewpoints;
choosing zones situated according to each of the specific virtual directions of each virtual field on each of the two selected computer-generated images; and
comparing said zones in searching for opposing differences from one computer-generated image to another,
wherein to realize each of said computer-generated images associated to a viewpoint being considered, at least one of radioactive emissions, electromagnetic rays, and mechanical vibrations emitted by said object are captured from each viewpoint to produce a signal, said signal is digitized to obtain digitized data, and said computer-generated images are calculated based on the obtained digitized data, and
wherein said computer-generated images show zones in different colors, said process searches for opposing differences on each of the two selected computer-generated images, and inversions of color contrasts between zones situated along each of the specific virtual directions of each field are sought.

2. Process according to claim 1, wherein if opposing differences appear presence of an object is concluded.

3. Process according to claim 1, wherein if, to determine whether an object is at least one of in front of and behind said surface, zones of comparison are chosen on at least one of one side and another side of said centers of said virtual fields in relation to each of the viewpoints for each of the specific virtual directions.

4. Process according to claim 1, wherein if, to determine whether said object extends further or less far in relation to said surface, zones of comparison are chosen more or less distant from said centers of said virtual fields.

5. Process according to claim 1, further comprising deducing the position of said object along the surface in relation to the position on the surface of the fields for which opposing differences were found.

6. Process according to claim 1, wherein to capture the electromagnetic rays or mechanical vibration at least one of an optical camera and a sonar is implemented at each viewpoint.

7. Process according to claim 1, wherein said different colors include different shades of grey.

8. A process for detecting an object in front of a bottom said bottom including a surface, said surface not necessarily being flat, said process comprising:
realizing a computer-generated image associated to a viewpoint being considered for each viewpoint by a geometric conversion at least including a projection in perspective of said object on said surface from at least two distinct viewpoints;
distinguishing between the computer-generated images for detecting a presence and determining a position of said object in relation to said surface, said distinguishing between the different computer-generated images including:
breaking said surface down into a mosaic of fields each including a center; and
associating a specific direction to each center and each viewpoint,
wherein each computer-generated image is broken down in virtual fields each including as many specific virtual directions as there are viewpoints, said process further including, to distinguish between the computer-generated images:
selecting at least two computer-generated images associated to at least two viewpoints;
choosing zones situated according to each of the specific virtual directions of each virtual field on each of the two selected computer-generated images; and
comparing said zones in searching for opposing differences from one computer-generated image to another;
wherein said geometric conversion also includes a projection, on a reference surface associated to a viewpoint being considered, said projection in perspective of said object on said bottom based on said viewpoint being considered,
said computer-generated image associated to the viewpoint being considered including:
an image realized by application of said geometric conversion on said object, and in addition to superposition, on said reference surface, and
an image realized through application of said geometric conversion on a virtual representation including sections of the bottom not masked by said projection in perspective of the object.

9. Process according to claim 8 wherein, to realize said computer-related image on the reference surface:
data relating to the computer-generated image on said reference surface are calculated based on said digitized data.

10. Process according to claim 8 for surveillance of bodies in a swimming pool; said bottom being at least one of the swimming pool bottom and sides of the swimming pool; said process being such that in an event that, after distinguishing the computer-generated image, it is concluded that there is a body in the swimming pool,
the distinguishing to distinguish a body having a suspicious trajectory from a body with a normal trajectory is reiterated, and
wherein an alarm signal is emitted if the body has a suspicious trajectory for an abnormally long period of time.

11. Process according to claim 10, wherein the body is situated close to the bottom.

12. Process according to claim 10, wherein at least two viewpoints are situated on the sides of the swimming pool in positions to sweep at least a fraction of a volume of water in the swimming pool,
said reference surface is roughly parallel to a surface of the water in the swimming pool.

13. A system for detecting an object in relation to a surface, said surface not necessarily being flat, said system comprising:
means for detecting and first means for calculating to realize a computer-generated image associated to a viewpoint being considered by a geometric conversion including at least one projection in perspective of said object on said surface from at least two distinct viewpoints and for each of the viewpoints;
means for discrimination to distinguish between the computer-generated images to detect a presence and to determine a position of said object in relation to said surface;
said means for discrimination including:
means for partition for breaking said surface down into a mosaic of fields each including a center and as many specific directions as there are viewpoints,
wherein each computer-generated image is broken down into virtual fields each including as many specific virtual directions as there are viewpoints, said means for discrimination also including, to distinguish between the computer-generated images:
means for selection for selecting at least two computer-generated images associated to at least two viewpoints;
means for choosing zones situated according to each of the specific virtual directions of each virtual field on each of the two selected computer-generated images;
means for comparison for comparing said zones in searching for opposing differences from one computer-generated image to another,
wherein to realize each of said computer-generated images associated to a viewpoint being considered, said system includes:
sensors in each viewpoint, said sensors including means for capturing at least one of radioactive emissions, electromagnetic rays, and mechanical vibrations emitted from said object, to produce a signal,
means for digitization to digitize said signal and to obtain digital data,
means for calculation to calculate said computer-generated images based on the obtained digital data,
wherein said computer-generated images show zones of different colors, said system searches out opposing differences on each of the two selected computer-generated images, and said means for discrimination includes means to search out inversions of contrasts of color between zones situated according to each of the specific virtual directions of each field.

14. System according to claim 13, wherein it is possible to conclude that there is an object because opposing differences appear as a result of the searching for opposing differences.

15. System according to claim 13, wherein to determine whether an object is at least one of in front of and behind said surface, said means for choosing the zones on each of the specific virtual directions chooses zones of comparison on at least one of one side and another of said centers of said virtual fields in relation to each of the viewpoints.

16. System according to claim 13, wherein to determine whether said object extends more or less far in relation to said surface, said means for choosing the zones on each of the specific virtual directions choose zones of comparison more or less distant from said centers from the virtual fields.

17. System according to claim 13, wherein the means for discrimination, to distinguish between computer-generated images, determines the position of said object along the surface in relation to the position on the surface of the fields for which opposing differences were found.

18. System according to claim 13, wherein said sensors, to capture electromagnetic rays and mechanical vibrations, include at least one of optical cameras and land sonars situated at each viewpoint.

19. System according to claim 13, wherein said different colors include different shades of grey.

20. A system for detecting an object in front of a bottom, said bottom including a surface, said surface not necessarily being flat, said system comprising:

means for detecting and first means for calculating to realize a computer-generated image associated to a viewpoint being considered by a geometric conversion including at least one projection in perspective of said object on said surface from at least two distinct viewpoints and for each of the viewpoints;

means for discrimination to distinguish between the computer-generated images to detect a presence and to determine a position of said object in relation to said surface;

said means for discrimination including:

means for partition for breaking said surface down into a mosaic of fields each including a center and as many specific directions as there are viewpoints, wherein each computer-generated image is broken down into virtual fields each including as many specific virtual directions as there are viewpoints;

said means for discrimination also including, to distinguish between the computer-generated images:

means for selection for selecting at least two computer-generated images associated to at least two viewpoints;

means for choosing zones situated according to each of the specific virtual directions of each virtual field on each of the two selected computer-generated images;

means for comparison for comparing said zones in searching for opposing differences from one computer-generated image to another, wherein said geometric conversion further includes a projection, on a reference surface associated with a viewpoint being considered, said projection in perspective of said object on said bottom based on said viewpoint being considered, said computer-generated image associated with the viewpoint being considered including:

an image realized by application of said geometric conversion of said object and in addition to superposition on said reference surface, an image realized by application of said geometric conversion to a virtual representation including sections of the bottom not masked by said projection in perspective of the object.

21. System according to claim 20, wherein to realize said computer-generated image on a reference surface:

said means for calculation calculates, based on said digital data, data relating to the computer-generated image on said reference surface.

22. System according to claim 20 for surveillance of bodies in a swimming pool; said bottom being at least one of the bottom and sides of the swimming pool; said system being such that in an event that, after distinguishing the computer generated images, it is concluded that there is a body in the swimming pool, said system also including:

means for reiteration to reiterate discrimination and to distinguish between a body with a suspicious trajectory from a body with a normal trajectory, means for emission to emit an alarm signal if the body has a suspicious trajectory during an abnormally long period of time.

23. System according to claim 22, wherein a body is situated near the bottom.

24. System according to claim 22, wherein at least two viewpoints are situated on the sides of the swimming pool in locations for sweeping at least a fraction of a volume of water in the swimming pool, and said reference surface is roughly parallel to a surface of the water in the swimming pool.

* * * * *